(12) United States Patent
Ogura et al.

(10) Patent No.: US 8,128,881 B2
(45) Date of Patent: Mar. 6, 2012

(54) EXHAUST-GAS CONVERTING APPARATUS

(75) Inventors: Yoshitsugu Ogura, Toyota (JP); Takayuki Endo, Toyota (JP); Takahiko Ido, Ogaki (JP)

(73) Assignees: Toyota Jidosha Kabushiki Kaisha, Toyota-shi, Aichi-ken (JP); Ibiden Co., Ltd., Gifu-ken (JP)

( * ) Notice: Subject to any disclaimer, the term of this patent is extended or adjusted under 35 U.S.C. 154(b) by 260 days.

(21) Appl. No.: 12/516,813

(22) PCT Filed: Dec. 3, 2007

(86) PCT No.: PCT/JP2007/073322
§ 371 (c)(1),
(2), (4) Date: May 29, 2009

(87) PCT Pub. No.: WO2008/066197
PCT Pub. Date: Jun. 5, 2008

(65) Prior Publication Data
US 2010/0034712 A1    Feb. 11, 2010

(30) Foreign Application Priority Data
Dec. 1, 2006   (JP) ................................. 2006-325756

(51) Int. Cl.
*B01D 50/00*   (2006.01)
(52) U.S. Cl. ....................................................... 422/177
(58) Field of Classification Search .................. 422/177, 422/180
See application file for complete search history.

(56) References Cited

U.S. PATENT DOCUMENTS
2002/0048542 A1   4/2002 Deeba et al.
2006/0148644 A1 * 7/2006 Hayashi ........................ 502/325

FOREIGN PATENT DOCUMENTS
EP   0 899 002   3/1999
(Continued)

OTHER PUBLICATIONS
Decision on Grant Patent for Invention for Russian Appl. No. 2009120456, dated Jul. 14, 2010.
(Continued)

*Primary Examiner* — Tom Duong
(74) *Attorney, Agent, or Firm* — Finnegan, Henderson, Farabow, Garrett & Dunner, LLP

(57) ABSTRACT

A storage catalyst 3 is constituted of a supporter substrate 30, which is formed of at least one member being selected from the group consisting of $Al_2O_3$, $CeO_2$, $ZrO_2$, $TiO_2$ and zeolite, and whose specific surface area is 30 m²/g or more, and a coating layer 31, which includes a supporting powder including at least one member being selected from the group consisting of $Al_2O_3$, $CeO_2$, $ZrO_2$, $TiO_2$ and zeolite, a storage material for storing $NO_x$ and $SO_x$, the storage material being supported on the supporting powder, and a noble metal being supported on the supporting powder.

Since the supporter substrate 30 has a large specific surface area, a supporting amount of the storage material for storing $NO_x$ and $SO_x$ augments remarkably. Therefore, an $SO_x$ storage amount of the storage catalyst, which is put in place on an upstream side of an $NO_x$ storage-and-reduction catalyst, augments, and thereby an $NO_x$ storage amount in low-temperature regions augments.

8 Claims, 2 Drawing Sheets

FOREIGN PATENT DOCUMENTS

| | | |
|---|---|---|
| EP | 1 319 436 | 6/2003 |
| EP | 1 808 228 | 7/2007 |
| JP | 57-117326 | 7/1982 |
| JP | 8-89803 | 4/1996 |
| JP | 8-103651 | 4/1996 |
| JP | 8-164349 | 6/1996 |
| JP | 2001-113172 | 4/2001 |
| JP | 2002-11347 | 1/2002 |
| JP | 2002-95967 | 4/2002 |
| JP | 2002-113077 | 4/2002 |
| JP | 2004-130269 | 4/2004 |
| JP | 2004-230241 | 8/2004 |
| JP | 2004-239218 | 8/2004 |
| JP | 2005-224682 | 8/2005 |
| JP | 2005-262144 | 9/2005 |
| RU | 2 029 107 | 2/1995 |
| RU | 2211724 | 2/2000 |
| WO | WO 95/17246 | 6/1995 |
| WO | WO 00/29726 | 5/2000 |

OTHER PUBLICATIONS

Extended European Search Report for EP Appl. No. 07832942.2, dated May 18, 2011.

\* cited by examiner

EXHAUST-GAS CONVERTING APPARATUS

CROSS-REFERENCE TO RELATED APPLICATIONS

This application is a national phase application of International Application No. PCT/JP2007/073322, filed Dec. 3, 2007, and claims the priority of Japanese Application No. 2006-325756, filed Dec. 1, 2006, the contents of both of which are incorporated herein by reference.

TECHNICAL FIELD

The present invention relates to an exhaust-gas converting apparatus for converting exhaust gas, which is emitted from internal-combustion engine for automobile, and the like; particularly it relates to an $NO_x$ storage-and-reduction type exhaust-gas converting apparatus that is optimum for converting exhaust gases from lean-burn engine.

BACKGROUND ART

Recently, the global warming phenomena that result from carbon dioxide have become problems, and reducing the emission of carbon dioxide has become an assignment. Even in automobiles, the reduction of carbon dioxide in the exhaust gases has become an assignment, and accordingly lean-burn engine for lean burning fuel in oxygen-rich atmosphere has been used. Since the usage amount of fuel is reduced by means of this lean-burn engine, it is possible to suppress the emission of carbon dioxide.

And, as a catalyst for converting harmful components in exhaust gases from lean-burn engine, an $NO_x$ storage-and-reduction catalyst has been known, $NO_x$ storage-and-reduction catalyst on which an $NO_x$ storage material being selected from the group consisting of alkali metals, alkaline-earth metals and rare-earth elements is supported along with a noble metal. Using this $NO_x$ storage-and-reduction catalyst, and controlling the composition of air-fuel mixture so as to turn it into stoichiometric-rich atmosphere in pulsating manner in the course of lean atmosphere, it is possible effectively to develop the oxidation of HC and CO and the reduction of $NO_x$ efficiently, and thereby high converting performance is obtainable.

However, in general $NO_x$ storage-and-reduction catalyst, there is such a problem that the $NO_x$ storage amount in low-temperature regions is insufficient.

Moreover, in exhaust gases, $SO_x$, which sulfur (S) being included in fuel burns to generate, is included, and then they are oxidized to turn into $SO_3$ by means of catalytic metal in oxygen-rich atmosphere. And, since it is readily turned into sulfurous acid or sulfuric acid by means of water vapor that is likewise included in the exhaust gases, and since these react with $NO_x$ storage material to generate sulfites and sulfates, it has become apparent that the $NO_x$ storage material has been poisoned to deteriorate. In addition, since porous supporter, such as alumina, has a property of being likely to store $SO_x$, there has been such a problem that the aforementioned sulfur poisoning has been facilitated.

And, when $NO_x$ storage material thus turns into sulfites and sulfates, it becomes difficult to store $NO_x$ any further, and there has been such a problem that the after-durability converting performance for $NO_x$ has declined.

Hence, in Japanese Unexamined Patent Publication (KOKAI) Gazette No. 2002-11,347, an $SO_x$ storage material is set forth, $SO_x$ storage material which includes a composite oxide including a rare-earth element and an aluminum oxide, and putting this $SO_x$ storage material in place on an upstream side of an $NO_x$ storage-and-reduction catalyst is set forth therein.

Moreover, in Japanese Unexamined Patent Publication (KOKAI) Gazette No. 2001-113,172, a catalyst for converting exhaust gas is proposed, catalyst in which a barrier layer for suppressing the diffusion of $SO_x$ is disposed on an $NO_x$ storage-and-reduction catalytic layer as an upper layer. The barrier layer includes an inorganic oxide on which a noble metal and a transition metal are supported. In accordance with this catalyst for converting exhaust gas, since the noble metal oxidized S at the barrier layer in lean atmosphere and then the generated $SO_x$ are captured firmly by the transition metal, the $SO_x$ are suppressed from diffusing to a lower layer, the $NO_x$ storage-and-reduction catalytic layer. And, the noble metal of the barrier layer reduces $SO_x$ in stoichiometric-rich atmosphere, then the bond between the transition metal and the $SO_x$ are disconnected, and thereby the $SO_x$ are released from the barrier layer. Therefore, the $SO_x$ storage ability of the barrier layer hardly saturates.

Hence, it is possible to think of putting a catalyst in which only the barrier layer as set forth in Japanese Unexamined Patent Publication (KOKAI) Gazette No. 2001-113,172 is formed in place on an upstream side of an $NO_x$ storage-and-reduction catalyst.

In accordance with an exhaust-gas converting apparatus in which a storage catalyst on which an $SO_x$ storage material being capable of storing $SO_x$ is thus put in place on an upstream side of an $NO_x$ storage-and-reduction catalyst, it is possible to suppress the sulfur poisoning of the downstream-side $NO_x$ storage-and-reduction catalyst. Moreover, since storing $SO_x$ means storing $NO_x$ as well, there might be a case where such an advantage is obtainable that the $NO_x$ storage amount in low-temperature regions increases.

However, in conventional storage catalyst, since there is a limitation on the supporting amount of $SO_x$ storage material so that the storage performance of $SO_x$ is not sufficient, there has been such a problem that the sulfur poisoning of $NO_x$ storage-and-reduction catalyst, which is put in place on a downstream side, cannot be prevented sufficiently. Moreover, in a case where an $SO_x$ storage material is supported in a large amount, there has been such a problem that the $SO_x$ storage material reacts with a supporter substrate so that the strength of the supporter substrate has declined considerably.

Patent Literature No. 1: Japanese Unexamined Patent Publication (KOKAI) Gazette No. 2001-113,172; and
Patent Literature No. 2: Japanese Unexamined Patent Publication (KOKAI) Gazette No. 2002-11,347

DISCLOSURE OF THE INVENTION

Assignment to be Solved by the Invention

The present invention is one which has been done in view of the aforementioned circumstances, and it is an assignment to be solved to augment the $SO_x$ storage amount of storage catalyst that is put in place on an upstream side of $NO_x$ storage-and-reduction catalyst and additionally to augment the $NO_x$ storage amount in low-temperature regions as well.

Means for Solving the Assignment

A characteristic of an exhaust-gas converting apparatus according to the present invention which solves the aforementioned assignment lies in that it is an exhaust-gas converting apparatus including: a storage catalyst for storing $NO_x$ and $SO_x$; and an $NO_x$ storage-and-reduction catalyst being put in place on an exhaust-gas-flow downstream side of the storage catalyst, and in that the storage catalyst includes:

a supporter substrate, which is formed of at least one member being selected from the group consisting of $Al_2O_3$, $CeO_2$, $ZrO_2$, $TiO_2$ and zeolite, and whose specific surface area is 30 $m^2/g$ or more; and a coating layer, which is formed on a surface of the supporter substrate, and which includes: a supporting powder including at least one member being selected from the group consisting of $Al_2O_3$, $CeO_2$, $ZrO_2$, $TiO_2$ and zeolite; a storage material for storing $NO_x$ and $SO_x$, the storage material being supported on the supporting powder; and a noble metal being supported on the supporting powder.

It is desirable to include the aforementioned storage material in the supporter substrate as well.

Effect of the Invention

In accordance with the exhaust-gas converting apparatus according to the present invention, the storage catalyst uses the supporter substrate, which is formed of at least one member being selected from the group consisting of $Al_2O_3$, $CeO_2$, $ZrO_2$, $TiO_2$ and zeolite, and whose specific surface area is 30 $m^2/g$ or more. Since this supporter substrate has a large specific surface area, the supporting amount of the storage material for storing $NO_x$ and $SO_x$ augments remarkably, and thereby the $SO_x$ storage amount and $NO_x$ storage amount in low-temperature regions augment markedly. Moreover, since the supporter substrate that is formed of such qualities of material is less likely to react with the storage material for storing $NO_x$ and $SO_x$, there is not such a problem that the strength of the supporter substrate has declined, either.

Therefore, the $NO_x$ converting performance improves as an exhaust-gas converting apparatus as a whole, and additionally the durability improves because it is possible to prevent the sulfur poisoning of the downstream-side $NO_x$ storage-and-reduction catalyst.

EXPLANATION ON REFERENCE NUMERALS

Figure 1:
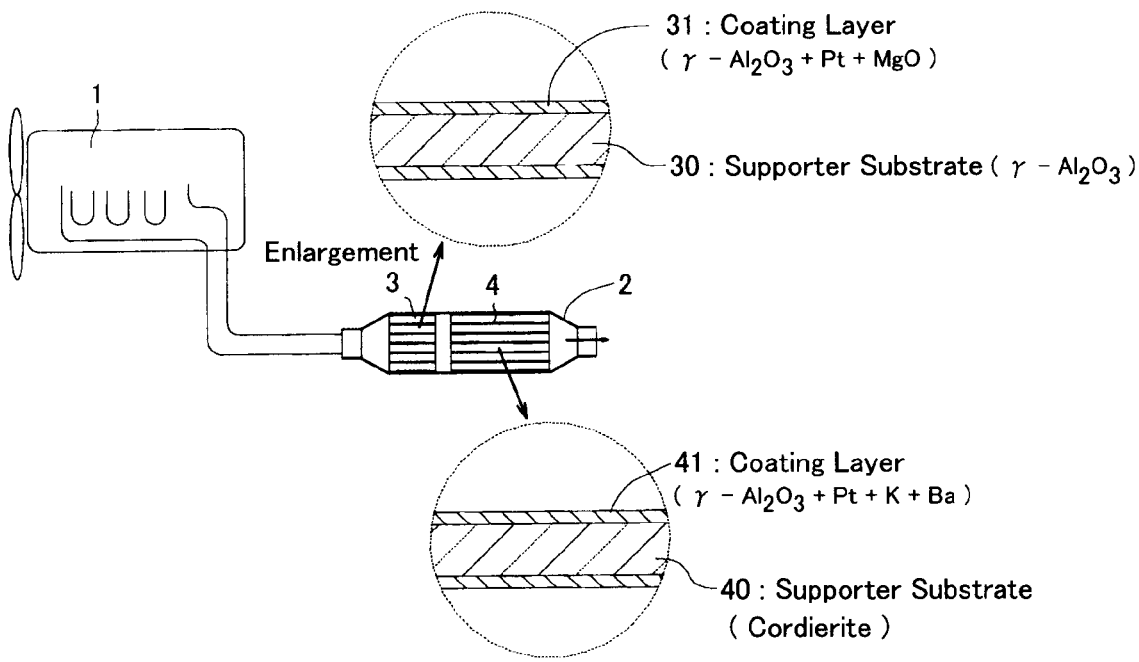
FIG. 1 is an explanatory diagram for illustrating an exhaust-gas converting apparatus according to an example of the present invention.

1: Engine;
2: Catalytic Converter;
3: Storage Catalyst; and
4: $NO_x$ Storage-and-Reduction Catalyst

BEST MODE FOR CARRYING OUT THE INVENTION

An exhaust-gas converting apparatus according to the present invention includes a storage catalyst for storing $NO_x$ and $SO_x$, and an $NO_x$ storage-and-reduction catalyst being put in place on an exhaust-gas-flow downstream side of the storage catalyst. Of these, for the $NO_x$ storage-and-reduction catalyst, it is possible to use one that is the same as the conventional one that is constituted of a porous oxide supporter, a noble metal being supported on the porous oxide supporter, and an $NO_x$ storage material being selected from the group consisting of alkali metals, alkaline-earth metals and rare-earth elements and being supported on the porous oxide supporter.

As for the porous oxide supporter that is used for the $NO_x$ storage-and-reduction catalyst, it is possible to use alumina, silica, silica-alumina, zirconia, titania, zeolite, or the like. It can be one member of these, or it is possible to mix or composite plural members of these to use. Among them, it is preferable to use γ-alumina whose activities are high.

As for the noble metal that is used for the $NO_x$ storage-and-reduction catalyst, Pt, Rh, Pd. Ir, and the like, can be exemplified. Among them, Pt whose activities are high is especially preferable. Moreover, it is preferable to set a supporting amount of the noble metal at 0.1-10 g per 1-L catalyst. When it is less than this, the converting activities become insufficient; and, when supporting it more than this, the effects saturate and additionally that has become costly.

Moreover, it is desirable to set a supporting amount of the $NO_x$ storage material in the $NO_x$ storage-and-reduction catalyst in a range of 0.01-2 mol per 1-L catalyst. When the supporting amount is less that this range, the $NO_x$ converting capacity has lowered because the $NO_x$ storage amount lowers; and, when it becomes more than this range, the noble metal is covered with the $NO_x$ storage material so that the activities have come to lower.

As for the alkali metals, lithium, sodium, potassium, and cesium can be exemplified. For the alkaline-earth metals, the group 2A elements in the periodic table, i.e., barium, beryllium, magnesium, calcium, strontium, and the like, can be exemplified. Moreover, as for the rare-earth elements, scandium, yttrium, lanthanum, cerium, praseodymium, neodymium, dysprosium, ytterbium, and so forth, can be exemplified.

The storage catalyst that makes a feature of the present invention includes a supporter substrate, and a coating layer that is formed on a surface of the supporter substrate. The supporter substrate is formed of at least one member being selected from the group consisting of $Al_2O_3$, $CeO_2$, $ZrO_2$, $TiO_2$ and zeolite, and has a specific surface area of 30 $m^2/g$ or more. The specific surface area being less than 30 $m^2/g$ is not preferable because a supporting amount of the storage material has become insufficient, and because the $SO_x$ storage amount decreases and additionally the $NO_x$ storage amount in low-temperature regions decreases as well. It is especially desirable that the specific surface area of the supporter substrate can be 50 $m^2/g$ or more.

Moreover, for a quality of material for the supporter substrate, $Al_2O_3$ or $ZrO_2$ is especially preferable among those as mentioned above. γ-$Al_2O_3$ is preferable because the specific surface area is high remarkably; since $ZrO_2$ is of high basicity, the storage performance of $SO_x$ improves furthermore. Moreover, according to later-described reasons, zeolite can also be a preferable quality of material.

The coating layer is one which includes a supporting powder that includes at least one member being selected from the group consisting of $Al_2O_3$, $CeO_2$, $ZrO_2$, $TiO_2$ and zeolite, a storage material for storing $NO_x$ and $SO_x$, storage material which is supported on the supporting powder, and a noble metal that is supported on the supporting powder. As for the supporting powder, according to the same reasons as mentioned above, $Al_2O_3$ or $ZrO_2$ is especially preferable; and, according to later-described reasons, zeolite is preferable as well. It is preferable to set a forming amount of the coating layer to 100 g or more per 1-L storage catalyst; and it is especially desirable to set it to 150 g or more per 1-L storage catalyst. When the forming amount of the coating layer is less, the storage amounts of $NO_x$ and $SO_x$ have lowered.

For the storage material for storing $NO_x$ and $SO_x$, it is desirable to use at least one member being selected from the group consisting of alkali metals and alkaline-earth metals. Among them, Mg or Ba whose basicity is high and which is good in terms of stability is preferable.

For example, although the oxide of alkali metal or the oxide of alkaline-earth metal, and the like, has a high ability of storing $NO_x$ and $SO_x$, it is on the contrary less likely to release stored $NO_x$ and $SO_x$. Consequently, a temperature at which it releases $NO_x$ and $SO_x$ has become high, and thereby there arises such a drawback that the storage amounts of $NO_x$ and $SO_x$ saturate in the case where it is employed in regions of from low temperature to intermediate temperature so that the storage of $NO_x$ and $SO_x$ that is those or more becomes difficult. However, when a storage material is made by supporting an alkali metal or an alkaline-earth metal onto a supporting powder, such as zeolite, by means of ion exchange, the temperature at which stored $NO_x$ and $SO_x$ are released becomes low, and thereby the repetition of storage and release of $NO_x$ and $SO_x$ becomes feasible even at an exhaust-gas temperature that falls in regions of from low temperature to intermediate temperature.

Moreover, one in which an alkali metal or an alkaline-earth metal is added to $ZrO_2$ exhibits an especially good storage capacity, compared with that of another storage material. And, when supporting a noble metal, such as Pt, Rh or Pd, and a transition-metal oxide, such as $CO_3O_4$, $NiO_2$, $MnO_2$ or $Fe_2O_3$, onto $ZrO_2$ with an alkali metal or an alkaline-earth metal added, the storage capacity improves furthermore. This is believed to be attributable to the following: an oxidizing activity is demonstrated by means of Pt and $CO_3O_4$, $NiO_2$, $MnO_2$, $Fe_2O_3$, or the like; and then NO or $SO_2$ in exhaust gases is oxidized and thereby the storage amounts augment.

Although it has not been apparent why an alkali metal or an alkaline-earth metal is thus effective, it is believed as follows: an alkali metal or an alkaline-earth metal solves into the lattices of $ZrO_2$ so that the alkali metal or the alkaline-earth metal is composited with the $ZrO_2$; and thereby the $ZrO_2$'s surface is reformed so that storage sites are generated anew.

Storage materials exhibit differing temperatures, at which they store $NO_x$ and $SO_x$, depending on their types. Hence, it is preferable as well to jointly use multiple types of storage materials that exhibit different temperatures for showing the maximum storage amounts. For example, when putting a low-temperature type storage material that stores $NO_x$ and $SO_x$ efficiently at low temperature in place on an upstream side and putting an intermediate-type storage material that stores $NO_x$ and $SO_x$ efficiently at intermediate temperature-high temperature in place on a downstream side to that, it is possible to store $NO_x$ and $SO_x$ in wide temperature regions from low-temperature regions to high temperature regions because $NO_x$ and $SO_x$ are stored gradually from the upstream side whose storage temperature is low. Moreover, since exhaust gases are heated by the heat generation by means of storing $NO_x$ and $SO_x$, such an effect is available that the activities of the downstream-side storage material or $NO_x$ storage-and-reduction catalyst are demonstrated at an early stage.

For example, as for a storage material that exhibits the maximum storage amount at room temperature-100° C., the following can be exemplified: those in which rare-earth elements, such as Ce, are supported on zeolite, those in which alkali metals, alkaline-earth metals or transition metals are supported on zeolite, and the like; and, as for a storage material that exhibits the maximum storage amount at 100-200° C., the following can be exemplified: those in which noble metals are supported on $ZrO_2$, those on which transition metals, such as $CO_3O_4$, are supported, and so forth; and, as for a storage material that exhibits the maximum storage at 300° C. or more, the following can be exemplified: those in which noble metals and alkali metals or alkaline-earth metals are supported on $ZrO_2$, $Al_2O_3$ or the like, and so on.

Since zeolite is also referred to as another name, a molecular sieve, it has pores that are equal to the sizes of molecules; and, in addition to being utilized as a storage material, it has been utilized as catalysts for many reactions. Moreover, since it includes cations for neutralizing the negative charges of its major component, $Al_2O_3$, and since these cations are readily exchanged with the other cations in aqueous solutions, it has been utilized as a cation exchanger. Therefore, it is possible to support at least one member of metals being selected from the group consisting of alkali metals and alkaline-earth metals on it by means of ion exchange, and it is possible to support the metal on it in an extremely highly-dispersed state.

And, since a metallic element being supported by means of ion exchange is supported on zeolite in an extremely highly-dispersed manner, it is believed that the activities are high extremely so that the oxidizing activities for NO and $SO_2$ in low-temperature regions improve. Consequently, it is believed that NO and $SO_2$ in exhaust gases are oxidized to turn into $NO_x$ and $SO_x$ on the storage material even in low-temperature regions and then they are stored into the storage material, and eventually $NO_x$ and $SO_x$ are stored sufficiently even in low-temperature regions.

Moreover, since HC in exhaust gases are also stored into zeolite, the reactions between the stored HC and $NO_x$ can be expected. Therefore, the $NO_x$ converting capacity improves furthermore.

Note that, as for zeolite, it is possible to use zeolites, such as ferrierite, ZSM-5, mordenite and type Y zeolite, and the like. Among them, since ZSM-5 and mordenite are good in terms of the ion-exchanging capacity, it is desirable to select it from these to use.

And, when putting the $NO_x$ storage-and-reduction catalyst in place on a downstream side of the storage material in which at least one metallic element being selected from the group consisting of alkali metals, alkaline-earth metals and rare-earth elements is supported on zeolite by means of ion exchange, even if $NO_x$ that cannot be stored with the storage material fully exist, they are stored into the downstream-side $NO_x$ storage-and-reduction catalyst because NO has already been turned into $NO_x$ even in low-temperature regions. Therefore, the $NO_x$ storing capacity in low-temperature regions improves, and then the $NO_x$ converting capacity improves.

Onto the coating layer, a noble metal is further supported. As for this noble metal, Pt, Rh, Pd, Ir, or the like, can be exemplified. Among them, Pt whose oxidizing activity is high is especially preferable. Moreover, it is preferable to set a supporting amount of the noble metal at 0.5-2.0 g per 1-L storage catalyst. When it is less than this, the storage performance of $NO_x$ and $SO_x$ becomes insufficient; and, when supporting it more than this, the effects saturate and additionally that has become costly.

A configuration of the supporter substrate in the storage catalyst can be adapted into pellet configurations, foam configurations, straight-flow type honeycomb configurations wall-flow type honeycomb configurations, and the like. Moreover, the coating layer is formed on a surface of the supporter substrate that comes in contact with exhaust gases. In the case of the supporter substrate with a wall-flow honeycomb type configuration, it is preferable to form the coating layer also on the inner surfaces of the pores within the partition walls that demarcate the inlet-side cells and outlet-side cells.

When manufacturing the supporter substrate of the storage catalyst as a straight-flow type honeycomb configuration, for instance, it can be manufactured by turning a powder, which includes at least one member being selected from the group consisting of $Al_2O_3$, $CeO_2$, $ZrO_2$, $TiO_2$ and zeolite, into a slurry whose viscosity is high along with a binder; and then firing it after subjecting it to extrusion molding. And, when forming the coating layer on a surface of the supporter substrate, it is allowable to carry it out as follows: a powder, which includes at least one member being selected from the group consisting of $Al_2O_3$, $CeO_2$, $ZrO_2$, $TiO_2$ and zeolite, is turned into a slurry whose viscosity is low relatively along with a binder; it is dried and fired after charging it into the supporter substrate and then suctioning it therefrom subsequently; it is thereafter impregnated with a solution in which a noble-metal compound is dissolved and with another solution in which a compound that includes a storage-material element includes in sequence; and then it is dried and fired.

When supporting the storage material onto the coating layer, a solution is used, solution in which a compound, such as nitrate, that includes a storage-material element is dissolved. Since it is sought to make a supporting amount of the storage material great as much as possible, it is desirable to set a concentration of the compound that includes a storage-material element in the solution at the saturated concentration. Moreover, since it is desirable to support it in a great amount in a single process, it is preferable that an amount of absorbed water in a state that the coating layer is formed can be at least 150 g or more per 1-L catalyst, and it is especially desirable that it can be 200 g or more per 1-L catalyst.

Moreover, in the supporter substrate of the storage catalyst as well, it is desirable that said storage material can be included. By means of this, the storage amounts of $NO_x$ and $SO_x$ augment furthermore. Although the storage material can be included in the supporter substrate to a certain extent by means of the aforementioned supporting method, it is desirable to mix a storage-material powder, such as MgO or BaO, into a slurry, which is used for the manufacture of the supporter substrate, in advance. When a mixing amount of the storage-material powder in this case becomes great, there might arise such a case that the strength of the supporter substrate has lowered or the specific surface area has become less than 30 $m^2$/g.

By the way, it has been understood that the converting reaction of $NO_x$ in the $NO_x$ storage-and-reduction catalyst includes: a first step of oxidizing NO in exhaust gases in lean atmosphere to turn it into $NO_2$; a second step of storing the $NO_x$ into $NO_x$-storing element; and a third step of reducing $NO_x$, which are released from the $NO_x$-storing element, on catalyst in stoichiometric-rich atmosphere. Therefore, in order that the $NO_x$-converting reaction proceeds smoothly, these respective steps should proceed smoothly, respectively.

However, it is believed that the oxidation reaction of NO is less likely to proceed in low-temperature regions of less than 300° C., for instance, so that the first step is less likely to proceed therein. Because of that, it is believed that the generation amount of $NO_x$ becomes less in low-temperature regions so that the second step and third step have come not to proceed smoothly, either, and thereby the $NO_x$ converting capacity in low-temperature regions becomes low.

Hence, in the exhaust-gas converting apparatus according to the present invention, it is adapted into such a construction that the storage catalyst is put in place on an exhaust-gas-flow upstream side of the $NO_x$ storage-and-reduction catalyst. The storage material that is included in the storage catalyst is likely to store $NO_x$, and stores $NO_x$ even in low-temperature regions. Therefore, since exhaust gases that hardly include $NO_x$ are supplied to the $NO_x$ storage-and-reduction catalyst in low-temperature regions, $NO_x$ are hardly discharged. And, when the temperatures of the exhaust gases rise, although the stored $NO_x$ are eliminated from the storage material to flow into the $NO_x$ storage-and-reduction catalyst, the aforementioned first step's reaction proceeds smoothly because the $NO_x$ storage-and-reduction catalyst has become the activation temperature already, and thereby NO is converted by means of reduction efficiently. By means of such a mechanism, it is possible to secure high $NO_x$ reduction conversions from low temperature up to high temperature in accordance with the exhaust-gas converting apparatus according to the present invention.

EXAMPLES

Hereinafter, the present invention will be explained in detail by means of examples and comparative examples.

Example No. 1

In FIG. 1, an exhaust-gas converting apparatus according to the present example is illustrated. In an exhaust-gas flow passage of an engine 1, a catalytic converter 2 is put in place. In the catalytic converter 2, a storage catalyst 3 is put in place on the upstream side, and an $NO_x$ storage-and-reduction catalyst 4 is put in place on the downstream side of the storage catalyst 3. Both of the storage catalyst 3 and $NO_x$ storage-and-reduction catalyst 4 are straight-flow-structured honeycomb catalysts.

The storage catalyst 3 included a straight-flow type honeycomb substrate 30 that was formed of γ-$Al_2O_3$, and a coating layer 31 that was formed on its cell wall surfaces. The honeycomb substrate 30 had a volume of 2 L, exhibited 600 cells/$in^2$, and had a specific surface area of 100 $m^2$/g. The coating layer 31 was formed in an amount of 150 g per 1-L honeycomb substrate 30.

The coating layer 31 was formed by wash coating a slurry that mainly included a γ-$Al_2O_3$ powder, and was supported with 2.0-g Pt per 1-L honeycomb substrate 30 and 2.5-mol MgO per 1-L honeycomb substrate 30. First of all, an alumina coating layer was formed by wash coating a slurry that mainly included a γ-$Al_2O_3$ powder and then drying and firing it. Next, the alumina coating layer was impregnated with a Pt chemical solution having a predetermined concentration in a prescribed amount, and was fired to support Pt thereon. Subsequently, it was impregnated with a magnesium nitrate aqueous solution (saturated aqueous solution) in the maximum amount, and was dried and fired to support MgO thereon. An amount of the supported MgO was 100 g per 1-L honeycomb substrate 30.

The $NO_x$ storage-and-reduction catalyst 4 included a straight-flow type honeycomb substrate 40 that was formed of cordierite, and a coating layer 41 that was formed on its cell wall surfaces. The honeycomb substrate 40 had a volume of 3 L, exhibited 400 cells/$in^2$, and had a specific surface area of 100 $m^2$/g. The coating layer 41 was formed in an amount of 150 g per 1-L honeycomb substrate 40.

The coating layer 41 included a γ-$Al_2O_3$ powder, and Pt, K and Ba that were supported on the γ-$Al_2O_3$ powder. Pt was supported in an amount of 2 g; K was supported in an amount of 0.1 mol; and Ba was supported in an amount of 0.1 mol; per 1-L honeycomb substrate 40.

Example No. 2

As a honeycomb substrate of the storage catalyst 3, instead of the γ-$Al_2O_3$ powder, one that was formed of a mixture powder was used, mixture powder in which a γ-$Al_2O_3$ powder and an MgO powder were mixed with a weight ratio of γ-$Al_2O_3$ powder:MgO powder=9:1. The honeycomb substrate had the same configuration as that of Example No. 1, and its specific surface area was 100 $m^2$/g. Using this honeycomb substrate, the same alumina coating layer as that of Example No. 1 was formed. The alumina coating layer was formed in an amount of 150 g per 1-L honeycomb substrate. When Pt and MgO were supported onto the alumina coating layer in the same manner as Example No. 1 except that the concentration of the magnesium nitrate aqueous solution differed, the supporting amounts of Pt and MgO were the same as those in Example No. 1. Note that, when the supported distribution of MgO was surveyed, it was supported in an amount of 1.0 mol/L on the honeycomb substrate and was supported in an amount of 1.5 mol/L on the coating layer.

Into the catalytic converter 2, the obtained storage catalyst was put in place on the upstream side, and the same $NO_x$ storage-and-reduction catalyst 4 as that of Example No. 1 was put in place on its downstream side, and then they were labeled as an exhaust-gas converting apparatus according to Example No. 2.

Comparative Example No. 1

As a honeycomb substrate of the storage catalyst 3, instead of the γ-$Al_2O_3$ powder, one that was formed of a cordierite powder was used. The honeycomb substrate had the same configuration as that of Example No. 1, and its specific surface area was 0.1-1 $m^2/g$. Using this honeycomb substrate, the same alumina coating layer as that of Example No. 1 was formed. The alumina coating layer was formed in an amount of 150 g per 1-L honeycomb substrate. And, when Pt and MgO were supported onto the alumina coating layer in the same manner as Example No. 1, the supporting amount of Pt was the same as that in Example No. 1, but the supporting amount of MgO was 1.0 mol/L and it was less than that in Example No. 1.

Into the catalytic converter 2, the obtained storage catalyst was put in place on the upstream side, and the same $NO_x$ storage-and-reduction catalyst 4 as that of Example No. 1 was put in place on its downstream side, and then they were labeled as an exhaust-gas converting apparatus according to Comparative Example No. 1.

Comparative Example No. 2

As a honeycomb substrate of the storage catalyst 3, instead of the γ-$Al_2O_3$ powder, one that was formed of a cordierite powder was used. The honeycomb substrate had the same configuration as that of Example No. 1, and its specific surface area was 0.1-1 $m^2/g$. Using this honeycomb substrate, the same alumina coating layer as that of Example No. 1 was formed. The alumina coating layer was formed in an amount of 150 g per 1-L honeycomb substrate. And, when Pt and MgO were supported onto the alumina coating layer in the same manner as Example No. 1, the supporting amount of Pt was the same as that in Example No. 1, but the supporting amount of MgO was 1.25 mol/L and it was less than that in Example No. 1.

Testing Example

Figure 2:
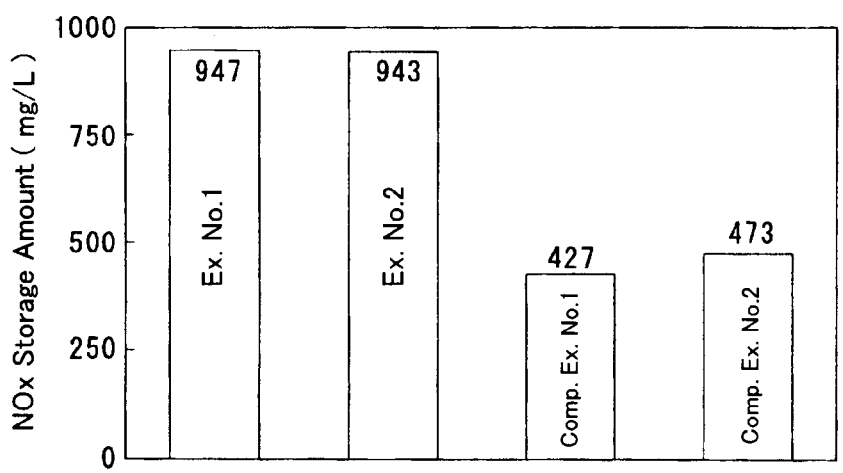
FIG. 2 is a bar graph for illustrating $NO_x$ storage amounts.

Only the storage catalysts 3, which were used for the exhaust-gas converting apparatuses of the respective examples and respective comparative examples, were fit onto an evaluating apparatus, respectively, and a stationary-lean model gas as set forth in Table 1 was flowed into them. The catalytic bed temperature was set at 150° C., and the model-gas flow volume was 30 L/min. And, the results of analyzing outlet gases from the catalysts to measure the $NO_x$ storage amounts are illustrated in FIG. 2.

TABLE 1

| NO (ppm) | $C_3H_6$ (ppm) | $O_2$ (%) | $CO_2$ (%) | $H_2O$ (%) | $N_2$ |
|---|---|---|---|---|---|
| 150 | 200 | 10 | 10 | 5 | Balance |

Moreover, only the storage catalysts 3, which were used for the exhaust-gas converting apparatuses of the respective examples and respective comparative examples, were fit onto an evaluating apparatus, respectively, and a stationary-lean model gas asset forth in Table 2 was flowed into them. The catalytic bed temperature was set at 400° C., and the model-gas flow volume was 30 L/min. And, FIG. 3 illustrates the results of measuring stored sulfur amounts when the model gas whose volume as sulfur was equivalent to 90 g per 1-L honeycomb substrate was passed through them.

TABLE 2

| $SO_2$ (ppm) | NO (ppm) | $C_3H_6$ (ppm) | $O_2$ (%) | $CO_2$ (%) | $H_2O$ (%) | $N_2$ |
|---|---|---|---|---|---|---|
| 125 | 200 | 200 | 10 | 10 | 5 | Balance |

Figure 3:
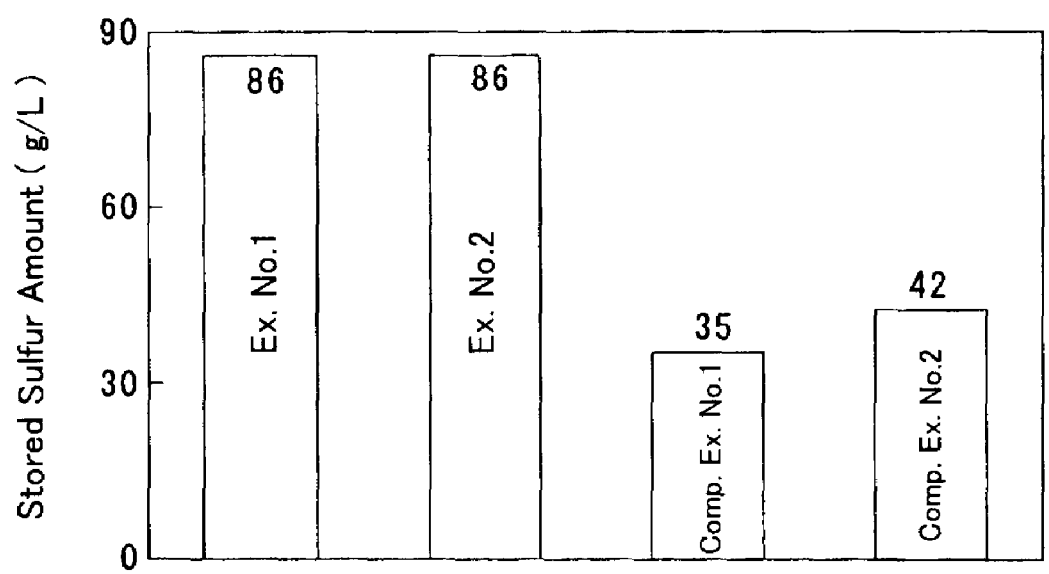
FIG. 3 is a bar graph for illustrating stored sulfur amounts.

According to FIG. 2 and FIG. 3, the storage catalysts according to Example No. 1 and Example No. 2 were good in terms of the $NO_x$ storage performance in low-temperature regions, and are good in terms of the $SO_x$ storage performance as well, and it is apparent that these result from the fact that the supporting amounts of MgO were abundant.

The invention claimed is:

1. An exhaust-gas converting apparatus comprising: a storage catalyst for storing $NO_x$ and $SO_x$; and an $NO_x$ storage-and-reduction catalyst being put in place on an exhaust-gas-flow downstream side of the storage catalyst, the exhaust-gas converting apparatus being characterized in that the storage catalyst comprises:

a supporter substrate, which is formed of at least one member being selected from the group consisting of $Al_2O_3$, $CeO_2$, $ZrO_2$, $TiO_2$ and zeolite, and whose specific surface area is 30 $m^2/g$ or more; and a coating layer, which is formed on a surface of the supporter substrate, and which comprises: a supporting powder comprising at least one member being selected from the group consisting of $Al_2O_3$, $CeO_2$, $ZrO_2$, $TiO_2$ and zeolite; a storage material for storing $NO_x$ and $SO_x$, the storage material being supported on the supporting powder; and a noble metal being supported on the supporting powder.

2. The exhaust-gas converting apparatus as set forth in claim 1, wherein said storage material is included in said supporter substrate.

3. The exhaust-gas converting apparatus as set forth in claim 2, wherein said supporter substrate is formed of $Al_2O_3$ or a mixture of $Al_2O_3$ and MgO.

4. The exhaust-gas converting apparatus as set forth in claim 2, wherein the specific surface area of said supporter substrate is 100 $m^2/g$ or more.

5. The exhaust-gas converting apparatus as set forth in claim 2, wherein a weight ratio of the supporter substrate and the storage material included in the supporter substrate is 9:1.

6. The exhaust-gas converting apparatus as set forth in claim 1, wherein the specific surface area of said supporter substrate is 50 $m^2/g$ or more.

7. The exhaust-gas converting apparatus as set forth in claim 1, wherein said storage material is at least one member being selected from the group consisting of alkali metals and alkaline-earth metals.

8. The exhaust-gas converting apparatus as set forth in claim 7, wherein said storage material includes at least one member being selected from the group consisting of magnesium and barium.

* * * * *